(No Model.)
C. A. SLOCUM.
ADVERTISING AND DISCOUNT COUPON BOOK, SHEET, OR CARD.
No. 430,044. Patented June 10, 1890.
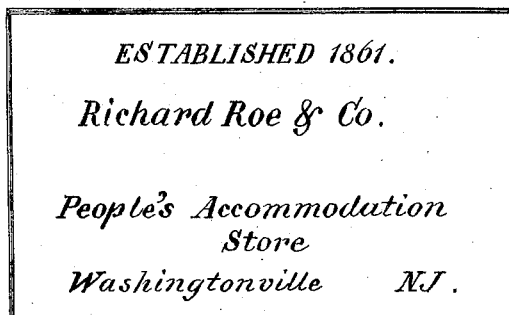
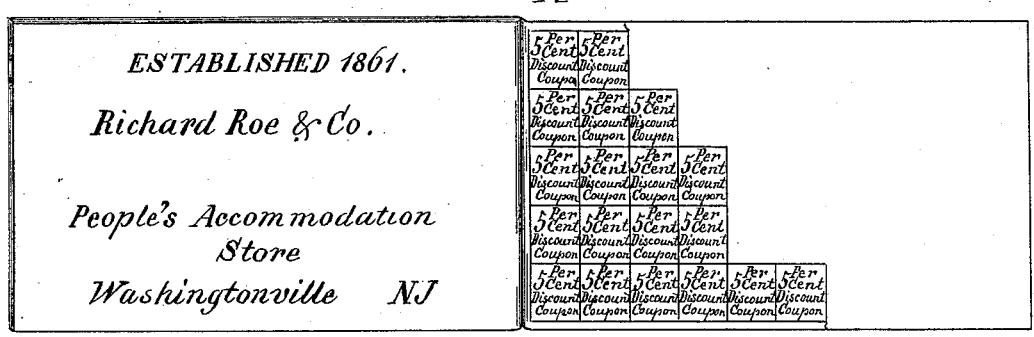
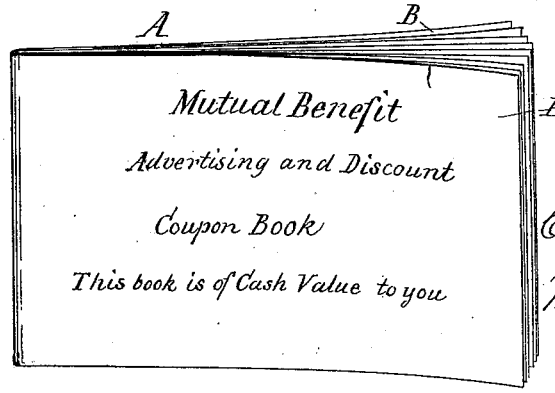

UNITED STATES PATENT OFFICE.

CHARLES A. SLOCUM, OF UTICA, NEW YORK, ASSIGNOR OF ONE-HALF TO CHARLES I. WILLIAMS, OF SAME PLACE.

ADVERTISING AND DISCOUNT COUPON BOOK, SHEET, OR CARD.

SPECIFICATION forming part of Letters Patent No. 430,044, dated June 10, 1890.

Application filed October 5, 1889. Serial No. 326,090. (No model.)

*To all whom it may concern:*

Be it known that I, CHARLES A. SLOCUM, a citizen of the United States, residing at Utica, in the county of Oneida and State of New York, have invented certain new and useful Improvements in Advertising and Discount Coupon Books, Sheets, or Cards; and I do hereby declare the following to be a full, clear, and exact description of the invention, such as will enable others skilled in the art to which it appertains to make and use the same.

My invention consists in an advertising medium in either the form of a card, folded sheet, or book, said advertising medium comprising the name and address or names and addresses of one or more business houses and attached discount-coupons. Such card, sheet, or book, upon presentation by the holder purchasing from any of the houses represented in said medium and the removal of one of the coupons, will entitle him to a discount of, say, five per cent.

The object of my invention is the production of an advertising medium which will be preserved because of its money value, thereby insuring to the advertiser and the holder of the medium a mutual benefit by securing to the advertiser an increased patronage and keeping his business constantly before the public and entitling the holder to a discount on articles purchased or other business transacted.

In the accompanying drawings, Figure 1 is a view showing my advertising and discount-coupon book opened and exhibiting an advertisement and one sheet of coupons. Fig. 2 is a similar view, except that a portion of the coupons have been torn out. Fig. 3 is a perspective view of my book partly open and showing a number of pages for advertising and coupon purposes. Fig. 4 is a view showing a single card with marginal coupons, and Fig. 5 is a view showing a single folded sheet which is provided with coupons on one leaf and with an advertisement on the other.

A represents a book provided with any desired number of leaves, one portion of which is for advertisements and the other for discount coupons, such leaves being so bound as to have the advertisement and coupon sheets occupy different places between the cover-lids, as clearly illustrated. The coupons may be detachably secured in the book by spaced perforations similar to those used in postage-sheets and bank-check books; or the coupon-pages may be imperforated, the coupons being separated by tearing-lines which serve as guides for removing the coupons.

One mode of arranging the leaves of my advertising coupon-book is to have the advertising and coupon pages alternate and provide one sheet of coupons for each advertiser, and to have the coupons appear directly opposite the advertisement to which said coupons refer, as by this means the merchant or other advertiser can readily find and remove his respective coupons; but the invention is not confined to that mode.

B B represent the side cover portions of my book, which may be suitably ornamented and inscribed with a title and other words most likely to attract and arrest the eyes of the public. The most preferable mode of employing my invention is to have a series of advertising coupon sheets or pages bound together in book form; but it is obvious that a single folded sheet, as A', Fig. 5, or an unfolded sheet of paper or card-board, as A², Fig. 4, might be made to embody my invention.

In Fig. 4 I have shown a single card with marginal coupons and a single advertisement in the center; but one or more business-houses might be embraced on this card. In Fig. 5 I have shown a single folded sheet which is provided with coupons on one half thereof and a single advertisement on the other; but more than one business-house might be represented on one of the halves of the sheet.

The benefit of my invention will be apparent from the following: By means of my invention a mutual benefit discount or percentage sheet, card, or book containing both advertisements and coupons can be produced which is convenient to both merchant and purchaser. It is contemplated to have the advertising medium furnished by advertising agencies in quantities to different merchants, and thus reduce their cost—say in book form, and the books containing the advertisements of a number of merchants, and also a suitable number of coupon-sheets. These advertising and coupon books are to be circulated by the merchants among the public, and whenever purchases are made at the different advertised places of business the merchants are to detach the percentage or discount coupons in numbers corresponding to the number of dollars expended for goods by purchasers, and when settlement or payment is made by the buyers the merchants are to make allowances or deductions from their rendered accounts in accordance with the amounts represented by the detached discount or percentage coupons.

What I claim is—

1. An advertisement-card containing an advertisement or advertisements provided with homogeneous or attached discount or percentage coupons adapted to be detached therefrom, substantially as described.

2. The combination, with a card or leaf having one or more advertisements upon it, of another leaf comprising discount or percentage coupons, said sheets being united and the coupons adapted to be detached therefrom, substantially as described.

3. The combination, with a book having leaves with advertisements thereon, of leaves comprising discount or percentage coupons, the whole bound together and the coupons adapted to be detached therefrom, substantially as described.

In testimony whereof I hereunto affix my signature in presence of two witnesses.

CHARLES A. SLOCUM.

Witnesses:
FREDERICK D. HAAK,
HORACE O. FARLEY.